(12) United States Patent
Pan et al.

(10) Patent No.: US 7,433,282 B2
(45) Date of Patent: Oct. 7, 2008

(54) RECORDING METHOD AND DRIVE FOR OPTICAL STORAGE MEDIA

(75) Inventors: Jyh-Shin Pan, Hsin Chu County (TW); Chao-Long Tsai, Hsin Chu (TW); Hong-Ching Chen, Feng Shan (TW)

(73) Assignee: MediaTek Inc., Hsin Chu (TW)

( * ) Notice: Subject to any disclaimer, the term of this patent is extended or adjusted under 35 U.S.C. 154(b) by 478 days.

(21) Appl. No.: 10/820,760

(22) Filed: Apr. 9, 2004

(65) Prior Publication Data
US 2005/0058046 A1    Mar. 17, 2005

(30) Foreign Application Priority Data
Sep. 17, 2003  (TW) .............................. 92125641 A

(51) Int. Cl.
*G11B 20/10* (2006.01)
(52) U.S. Cl. ................. 369/47.3; 369/59.12; 369/47.52
(58) Field of Classification Search ........................ None
See application file for complete search history.

(56) References Cited

U.S. PATENT DOCUMENTS

| | | | |
|---|---|---|---|
| 6,119,201 A | 9/2000 | Kulakowski et al. | |
| 6,198,707 B1 | 3/2001 | Yamamoto | |
| 6,252,838 B1 * | 6/2001 | Kuroda et al. | 369/47.28 |
| 6,418,099 B2 | 7/2002 | Yamamoto | |
| 6,487,616 B1 | 11/2002 | Hayashi | |
| 6,560,180 B1 * | 5/2003 | Tsukihashi et al. | 369/53.31 |
| 6,570,832 B2 | 5/2003 | Yamamoto | |
| 2002/0048240 A1 * | 4/2002 | Pan et al. | 369/47.31 |
| 2003/0072229 A1 * | 4/2003 | Hasegawa et al. | 369/47.3 |
| 2003/0095479 A1 * | 5/2003 | Shimoi et al. | 369/47.3 |

* cited by examiner

*Primary Examiner*—Joseph Feild
*Assistant Examiner*—Christopher R Lamb
(74) *Attorney, Agent, or Firm*—Muncy, Geissler, Olds, & Lowe PLLC

(57) ABSTRACT

A recording method and drive for optical storage media. The method inserts or replaces a special pattern in a recording EFM signal before the recording process is interrupted. Therefore, the special pattern is recorded either before or on the interrupted position. The starting position of the succeeding recording process is located by searching for the special pattern.

19 Claims, 9 Drawing Sheets

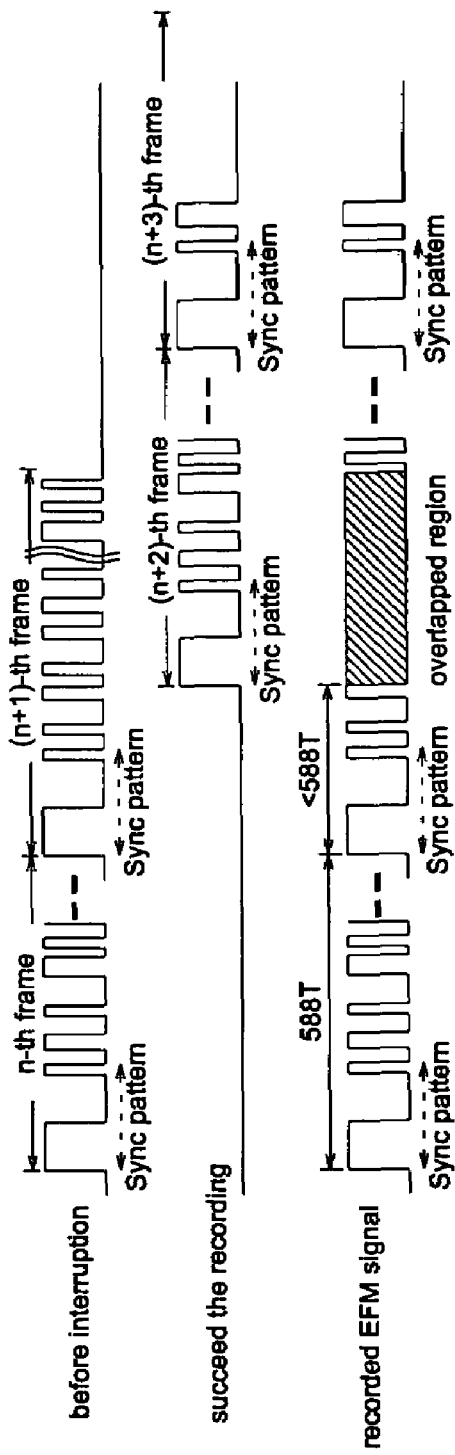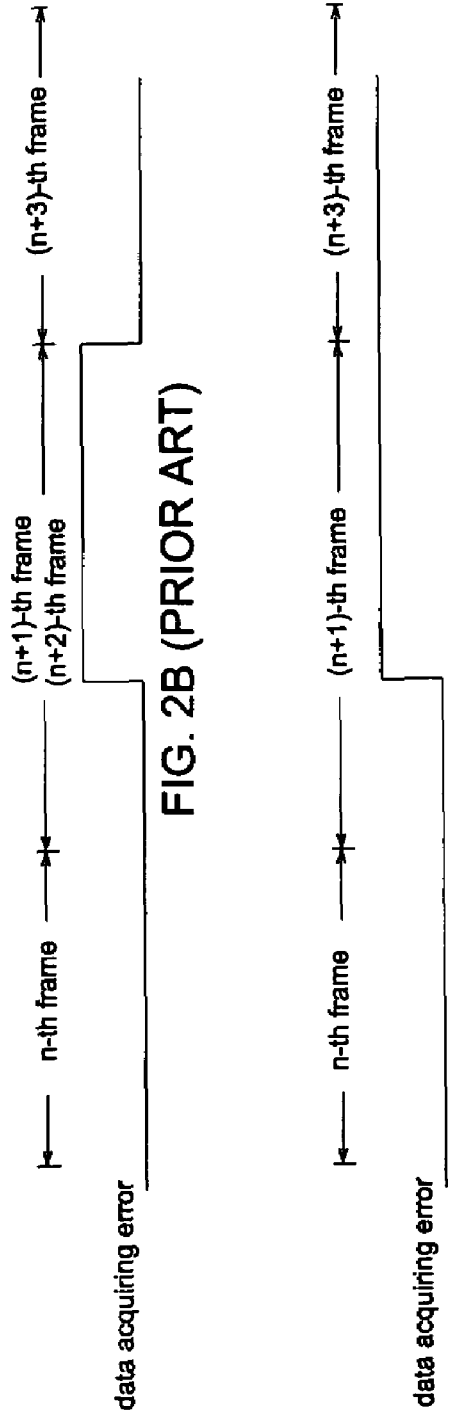
FIG. 2A (PRIOR ART)
FIG. 2B (PRIOR ART)
FIG. 2C (PRIOR ART)

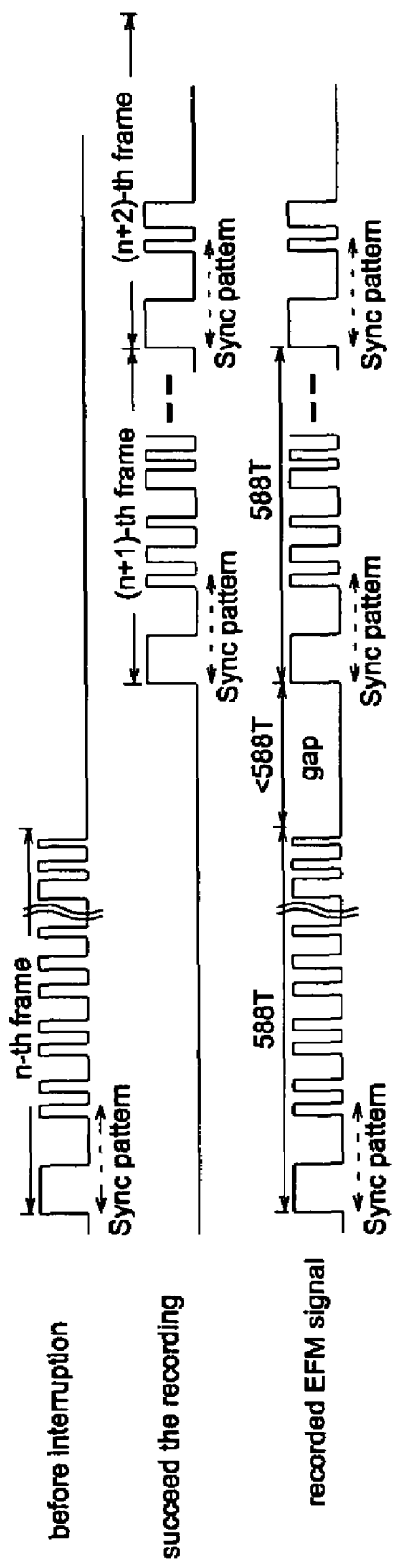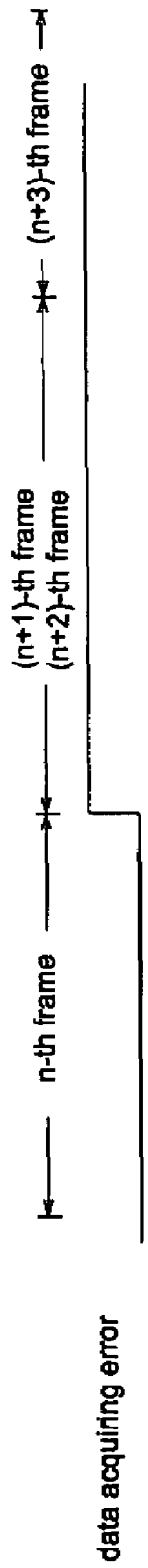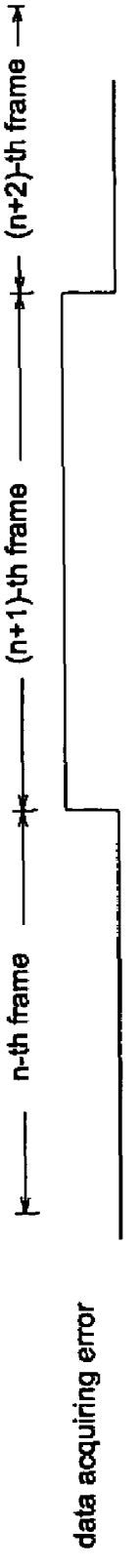
FIG. 3A (PRIOR ART)
FIG. 3B (PRIOR ART)
FIG. 3C (PRIOR ART)

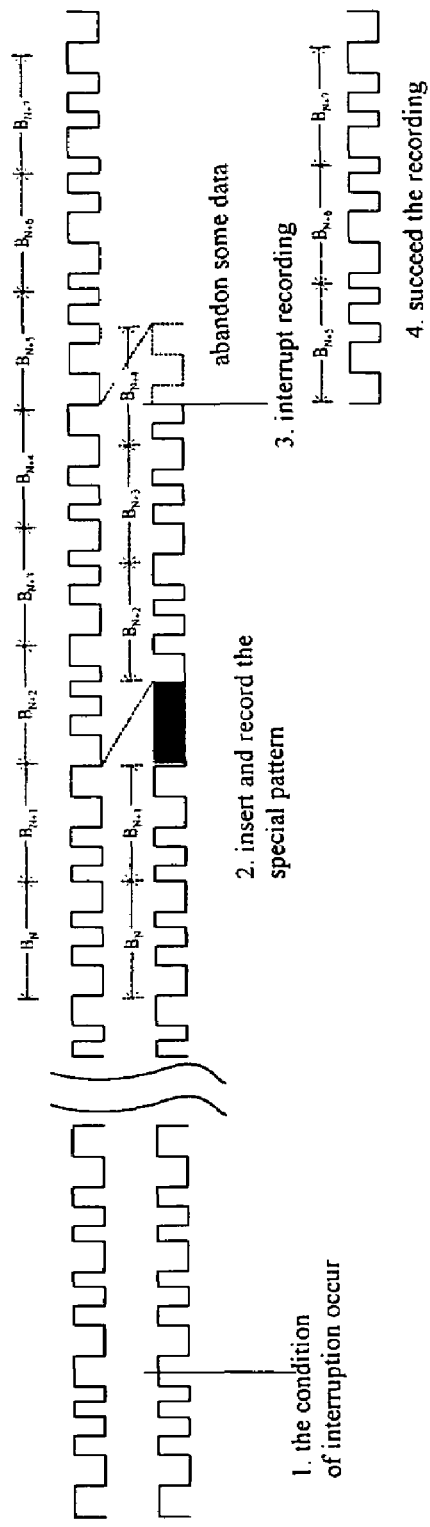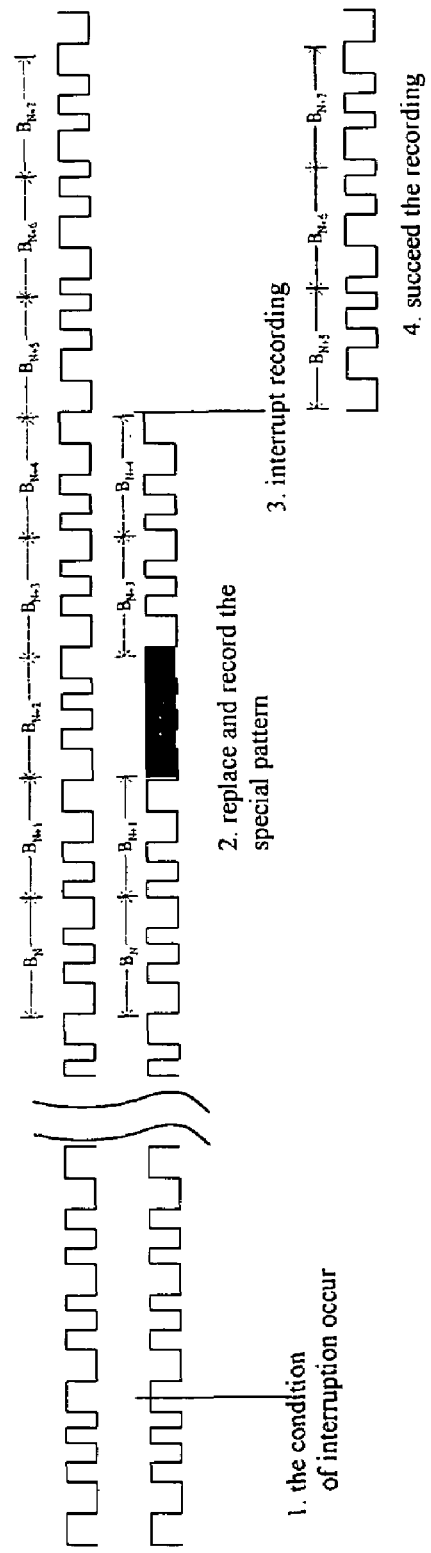

| data symbol | EFM codeword |
|---|---|
| 0 | 01001000100000 |
| 1 | 10000010000000 |
| 2 | 10010000100000 |
| ⋮ | ⋮ |
| 89 | 10000000000100 |
| ⋮ | ⋮ |
| 254 | 00010000010010 |
| 255 | 00100000010010 |

RECORDING METHOD AND DRIVE FOR OPTICAL STORAGE MEDIA

This Nonprovisional application claims priority under 35 U.S.C. § 119 (a) on patent application Ser. No (s). 092125641 filed in Taiwan on Sep. 17, 2003, the entire contents of which are hereby incorporated by reference.

BACKGROUND OF THE INVENTION

1. Field of the Invention

The invention relates to a recording method and drive for optical storage media, and more particularly to a recording method and drive for optical storage media, which are capable of positioning a starting position for succeeding the recording by searching for a special pattern recorded on an optical disk.

2. Description of the Related Art

A recordable compact disk (CD-Recordable or CD-R) or a rewritable compact disk (CD-Rewritable or CD-RW) is a CD-type optical disk medium, and includes a continuous spiral groove. Input data is modulated and recorded into the continuous spiral groove. The input data is composed of the main data, error correction data, address information, and other miscellaneous content. The channel modulation for CD-type medium is the eight-to-fourteen modulation (EFM). The eight-to-fourteen modulation modulates every eight-bit data symbol into one fourteen-bit codeword with three-bit merging bits. In the CD-type specifications, data is recorded in unit of sector, which is accessed at a constant linear velocity (CLV).

FIG. 1 illustrates the data architecture for each recording unit in a typical CD-RW optical disk. Referring to FIG. 1, each recording unit includes 75 sectors. Each sector includes 98 frames, each of which has 588 bits and is composed of a 24 bit sync pattern, 14 bit control and display data, information data, correction polarity data, and the like. The unit of each bit is T. The restricted records may be placed in the table of content (TOC) of the optical disk for positioning the starting point of the sector. Because a part of the data has been set and recorded in advance, it is important to prevent the drive recording process from being interrupted.

The typical CD-RW includes a buffer for buffering the input data in advance and indexing the input data to the corresponding sectors so that the data is recorded into the continuous area of the optical disk. However, when the buffer of the CD-RW cannot receive data from the host (e.g., the host is interrupted by the job having higher priority), the buffer will be empty owing to lack of data (data under-run), thereby causing the recording process to be interrupted and causing the recorded data hard to be retrieved.

In view of the problem, U.S. Pat. No. 6,119,201 discloses a data under-run protection method using formatted padding sectors. The method of this patent is to solve the problem of data under-run by recording one or more formatted padding sectors to prevent the recording process from being interrupted when the data under-run occurs. However, the method wastes some recordable area on padding the data of one or more formatted padding sectors. In addition, the reading time will be wasted to judge if the data is the padding sector during the reading process. Furthermore, the method cannot overcome the problem of recording interruption caused by an error of the control for the focus/tracking servo, or a shock to the drive.

Therefore, it is necessary to provide a drive and a method for directly succeeding the recording without additionally padding data when the recording process is interrupted due to data under-run or other reasons.

The frame length of the recorded data needs to be precisely controlled to a nominal length of 588T (bits) when retrieving the recorded data, so that the optical drive can correctly retrieves the recorded data. FIG. 2 illustrates a schematic diagram showing two overlapped frames when the recording is succeeded, wherein FIG. 2A illustrates the recording signal before interruption, the signal after the recording being succeeded, and the recorded EFM signal; FIG. 2B illustrates the schematic diagram when the decoder treats the overlapped region as two frames; and FIG. 2C illustrates the schematic diagram when the decoder treats the overlapped region as one frame. As shown in FIG. 2A, if the (n+2)-th frame and the (n+1)-th frame are overlapped, optical disk reading errors will occur because the (n+1)-th frame is covered by the (n+2)-th frame, and the (n+1)-th frame and the (n+2)-th frame cannot be correctly recognized. For example, if the signal is treated as two frames as in FIG. 2B or as one frame as in FIG. 2C, data errors occur.

Next, FIG. 3A illustrates the situation when a gap exists between two recorded frames. Three signals are shown: the signal before the recording being interrupted, the signal after the recording being succeeded, and the recorded EFM signal; FIG. 3B illustrates the situation that the decoder treats the overlapped region as two frames; and FIG. 3C illustrates the situation that the decoder treats the overlapped region as one frame. As shown in FIG. 3, if the (n+1)-th frame (being succeeded recording) and the n-th frame (being interrupted) are spaced apart by a linking gap, read errors may occur because the linking gap has no sync pattern and the optical disk cannot correctly recognize the frames during the reading procedure. For example, if the signal is treated as two frames as in FIG. 2B or as one frame as in FIG. 2C, data errors occur. Consequently, it is important to position the recording interruption position correctly to succeed the recording.

SUMMARY OF THE INVENTION

In view of the above-mentioned problems, an object of the invention is to provide a recording method and drive for optical storage media, wherein a special pattern is recorded before the recording interruption, such that the starting position to succeed the recording can be located by searching for the special pattern.

To achieve the above-mentioned object, the recording method for the optical storage media of the invention inserts a special pattern into a recording signal stream or replaces a portion of the recording signal stream with the special pattern before the recording is interrupted, so as to record the special pattern in front of the interrupted position. Thereafter, when the optical drive wants to succeed the recording, the starting position for succeeding the recording can be located correctly by searching for the special pattern.

BRIEF DESCRIPTION OF THE DRAWINGS

FIG. 2A illustrates the situation that a succeeding recorded data frame overlaps the previously recorded data frame according to a prior art strategy.

FIG. 2B illustrates the situation that the decoder treats the overlapped region as two frames when the recorded frames are overlapped.

FIG. 2C illustrates the situation that the decoder treats the overlapped region as one frame when the recorded frames are overlapped.

FIG. 3A illustrates the situation in which a succeeding recorded data frame forms a gap with the previous data frame according to a prior art strategy.

FIG. 3B illustrates the situation that the decoder treats the linking region as two frames when the gap exists between the recorded frames.

FIG. 3C illustrates the situation that the decoder treats the linking region as one frame when the gap exists between the recorded frames.

FIG. 5 shows a data distribution chart when the special pattern is inserted into the recording EFM signal stream, wherein the upper waveform represents the recording EFM signal stream if no recording interruption occurs, the middle waveform represents the recording EFM signal stream before the recording interruption, and the lower waveform represents the recording EFM signal stream after the recording is succeeded.

FIG. 6 shows a data distribution chart when a portion of the recording EFM signal stream is replaced with the special pattern, wherein the upper waveform represents the recording EFM signal stream if no recording interruption occurs, the middle waveform represents the recording EFM signal stream before the recording interruption, and the lower waveform represents the recording EFM signal stream after the recording is succeeded.

FIGS. 9A to 9G illustrate some signals at the data recording interruption and linking, wherein FIG. 9A illustrates the EFM data recorded on the disk, FIG. 9B illustrates the recorded EFM signal obtained from the disk, FIG. 9C illustrates the count value of the special pattern detector, FIG. 9D illustrates the detection length threshold of the special pattern detector, FIG. 9E illustrates the detection signal of the special pattern detector, FIG. 9F illustrates the laser enable signal, and FIG. 9G illustrates the laser recording pulse.

DETAILED DESCRIPTION OF THE INVENTION

The recording method and drive for optical storage media of the invention inserts a special pattern into the recording EFM signal stream or replaces a portion of the recording EFM signal stream with the special pattern before the recording is interrupted so as to record the special pattern in front of the interrupted position. Thereafter, when the optical drive succeeds the recording, the starting position can be located correctly by searching for the special pattern. The embodiments of the invention will be described with reference to the accompanying drawings.

Figure 1:
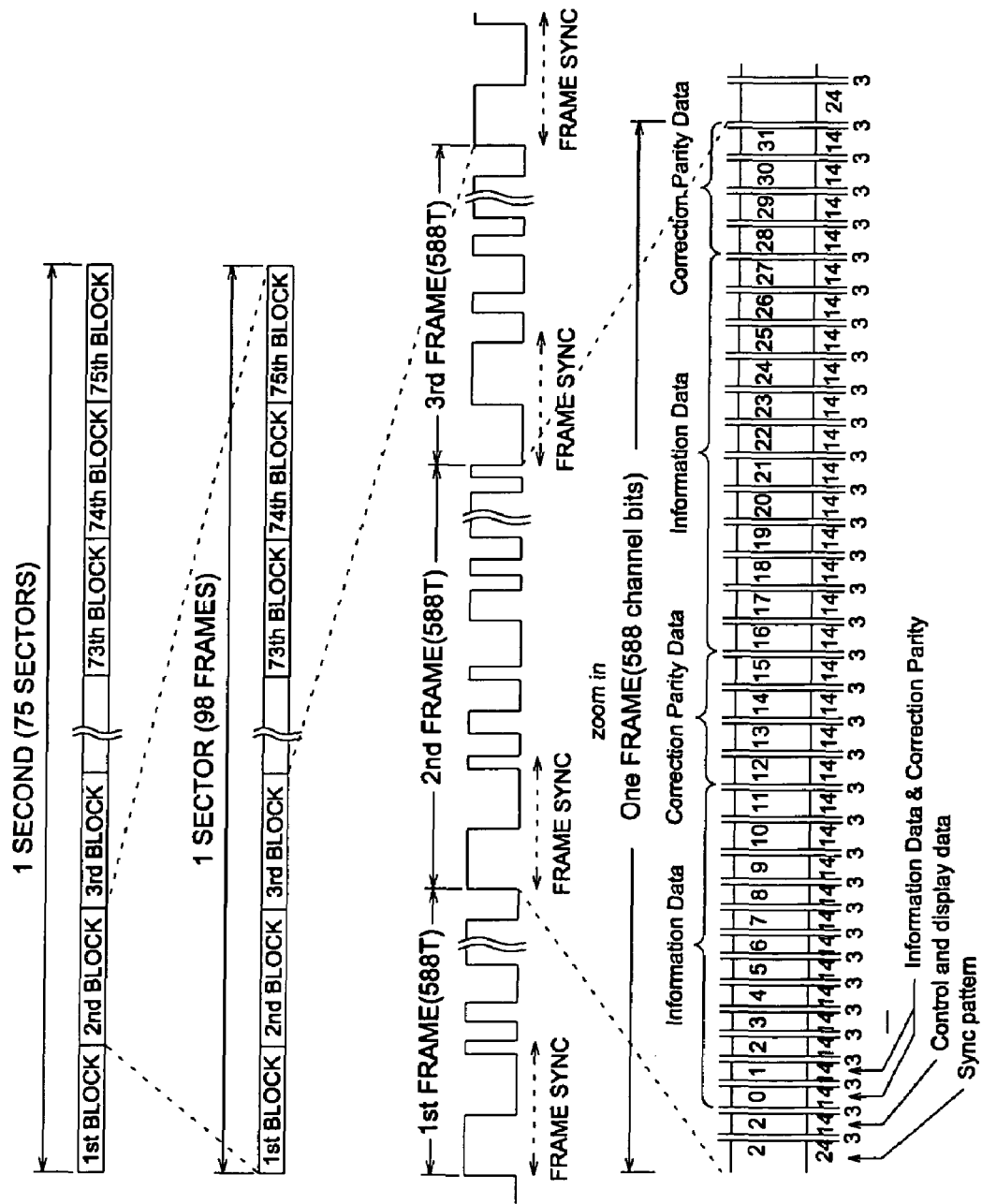
FIG. 1 illustrates a typical CD-R data structure.
Figure 4:
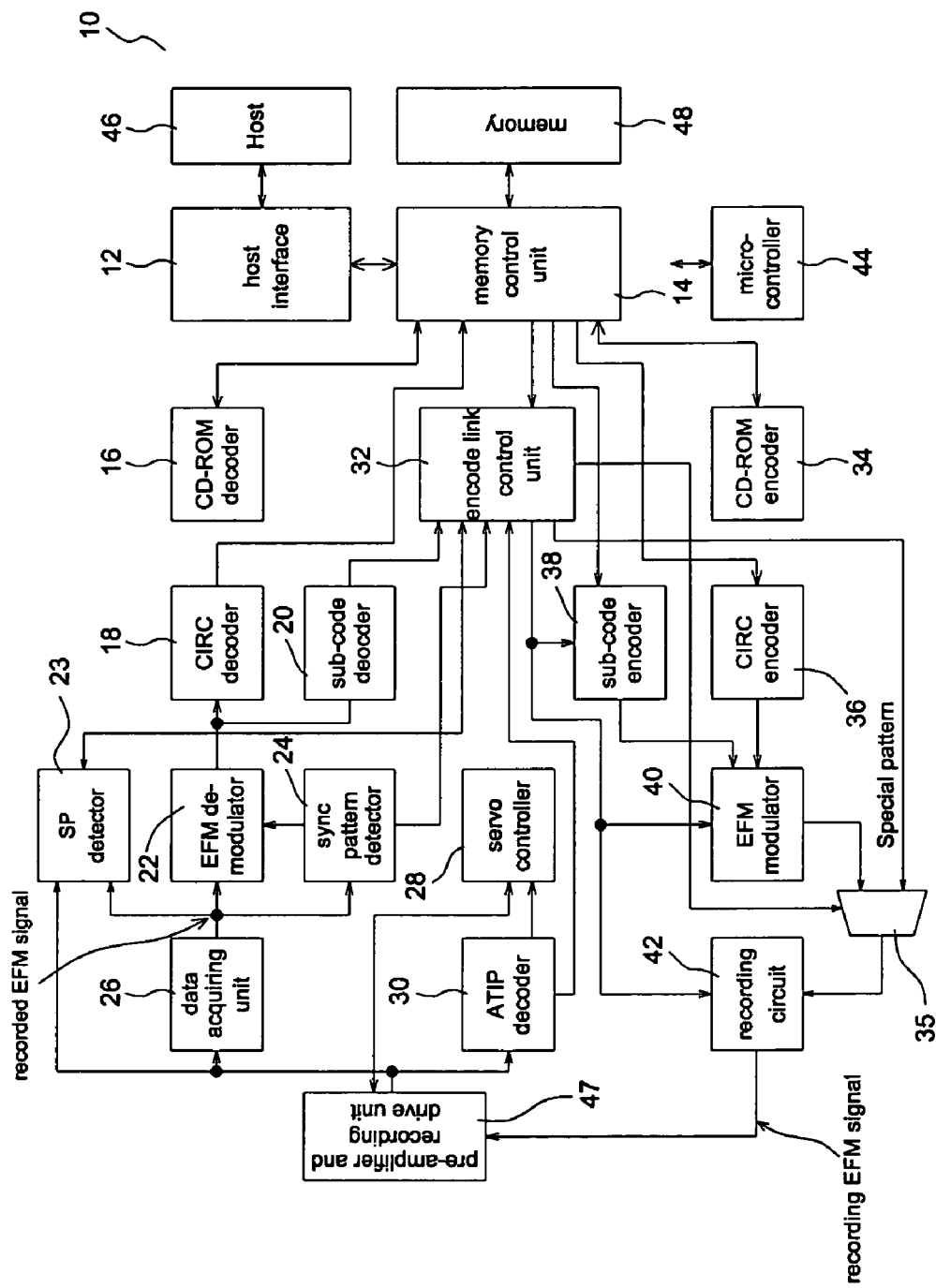
FIG. 4 is a block diagram showing a recording drive for optical storage media of the invention.

FIG. 4 is a block diagram showing a recording drive for optical storage media of the invention. Referring to FIG. 4, in addition to a host interface 12, a memory control unit 14, a CD-ROM decoder 16, a CIRC (cross-interleaving Reed-Solomon code) decoder 18, a sub-code decoder 20, an EFM (Eight-to-Fourteen modulation) demodulator 22, a sync pattern detector 24, a data acquiring unit 26, a servo controller 28, an ATIP (Absolute Time In Pre-groove) decoder 30, an encode-link control unit 32, a CD-ROM encoder 34, a CIRC encoder 36, a sub-code encoder 38, an EFM modulator 40, a recording circuit 42, and a microcontroller 44, the recording drive 10 for optical storage media of the invention further includes a multiplexer 35 and a special pattern (SP) detector 23. The recording circuit 42 outputs a recording EFM signal to the pre-amplifier and a recording drive unit 47.

Most of the units in FIG. 4 have the same functions as those of the conventional optical disk drive. The difference between the conventional drive and the invention is that the special pattern detector 23 can locate the starting position correctly for succeeding the recording according to the special pattern, and output a detection signal to the encode-link control unit 32 for succeeding the recording operation. The function of the sub-code decoder 20 is to detect and output a sub-code address information for a recorded sector. The function of the ATIP decoder 30 is to detect and output an ATIP time information that is prerecorded during manufacture of the optical storage media.

When the encode-link control unit 32 of the optical disk drive 10 detects the condition that the recording process is to be interrupted, the encode-link control unit 32 outputs the special pattern as well as a control signal to the multiplexer 35 before the recording process is interrupted. Then, a portion of the recording EFM signal stream generated by the EFM modulator 40 is replaced with the special pattern, or the special pattern is inserted into the recording EFM signal stream which is then output to the recording circuit 42. Therefore, the special pattern is recorded in front of the interruption position on the optical disk. When the condition of recording interruption is eliminated, the drive 10 reads the recorded EFM signal stream from the optical disk, and utilizes the special pattern detector 23 to find the position of the special pattern recorded on the optical disk as a reference to determine the starting position for succeeding the recording. Although there is some data loss at the boundary of the interruption of recording, the data loss can be corrected by the CIRC decoding procedure. In another word, once the recording is succeeded by using the method after the recording is interrupted, the data recorded on the disk still can be read correctly after the CIRC decoding procedure.

FIG. 5 illustrates the special pattern being inserted into the recording EFM signal stream, wherein the upper waveform represents the recording EFM signal stream if no recording interruption occurs, the middle waveform represents the recording EFM signal stream before the recording interruption, and the lower waveform represents the recording EFM signal stream after the recording is succeeded. As shown in FIG. 5, when the optical disk drive 10 detects that the condition of interruption occurs at the first time point and the recording process will be interrupted, the encode-link control unit 32 outputs the special pattern at the second time point, disables the EFM modulator 40 from outputting the recording EFM signal, and controls the multiplexer 35 to select and output the special pattern. At third time point, the recording process is interrupted. Consequently, a portion of the recording EFM signal stream (the partial data in back of $B_{N+4}$) will be abandoned and not recorded on the disk after the recording is interrupted. Therefore, when the recording process is succeeded at the fourth time point, the recording process is performed from the data of $B_{N+5}$.

FIG. 6 illustrates a data distribution chart that a portion of the recording EFM signal stream is replaced with the special pattern, wherein the upper waveform represents the recording EFM signal stream if no recording interruption occurs, the middle waveform represents the recording EFM signal stream before the recording interruption, and the lower waveform represents the recording EFM signal stream after the recording is succeeded. As shown in FIG. 6, at the first time point, the optical disk drive 10 detects the condition of interruption and the recording process will be interrupted. At the second time point, the encode-link control unit 32 outputs the special pattern and controls the multiplexer 35 to select and output the special pattern. At the third time point, the recording process is interrupted. Therefore, when the recording process is succeeded at the fourth time point, the recording process is performed from the data of $B_{N+5}$. The advantage of this method is that it only needs to output the special pattern and control the multiplexer 35 without disabling the EFM modulator 40 from outputting the recording EFM signal.

Figures 7, 8:
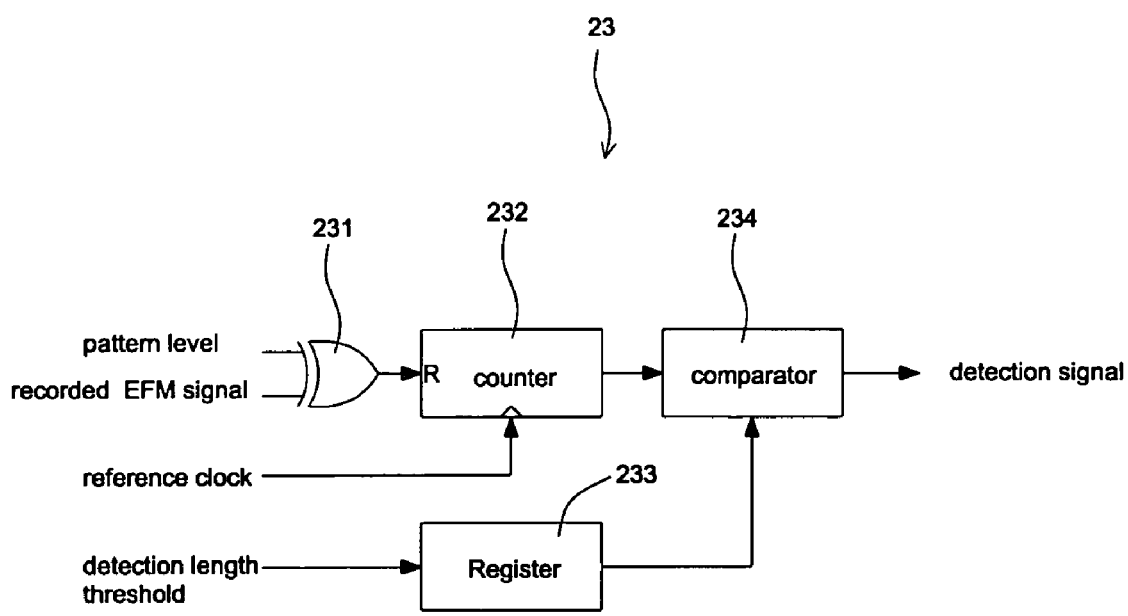
FIG. 7 is a table showing the EFM codewords of the EFM modulation.
FIG. 8 is a block diagram showing a special pattern detector of the embodiment.

The special pattern contains a data pattern that does not appear in a normal format of the data to be recorded on the optical disk, or contains a data pattern that is absent from the data recorded on the optical disk. That is, the special pattern can be distinguished from a normal format of the data recorded on the optical disk, or can be detected as being different from the data recorded on the optical disk. An example of the normal format of the data is the format of the EFM modulation. FIG. 7 shows a table of the EFM codewords of the EFM modulation for some data symbols. In the EFM modulation for the CD specification, the maximum run length of the result of the EFM modulation is 11T (11 bits), which means that the maximum length of the continuously identical signal status of the recording EFM signal is 11T. Therefore, the special pattern can contain a data pattern that has a length of continuously identical signal status greater than the maximum run length of the recording EFM signal. For example, the special pattern can contain a data pattern with 30 bits of continuously identical "1", or contain a data pattern with 30 bits of continuously identical "0". Another example is that the special pattern can contain a data pattern that can be distinguished from the valid EFM codewords.

When the drive 10 records a data pattern with 30 bits of continuously identical "1" as the special pattern, the special pattern detector 23 receives the recorded EFM signal stream and finds the special pattern by detecting a data pattern having a length of continuously identical signal status greater than the maximum run length of the recording EFM signal. When the special pattern detector 23 has found the special pattern, a detection signal is enabled. The encode-link control unit 32 enables the procedure for succeeding the recording according to the detection signal. Although the special pattern is a data pattern with 30 bits of continuously identical "1", it only needs to detect a portion of the special pattern, 12 bits of continuously identical "1" or more, as long as the portion of the special pattern can be distinguished from the normal format of the recording EFM signal.

FIG. 8 is a block diagram showing a special pattern detector of the embodiment. The special pattern detector 23 is designed according to the type of the special pattern. In this embodiment, the special pattern contains a data pattern with continuously identical signal status greater than the maximum run length of the recording EFM signal, and the special pattern detector 23 is used to detect the special pattern with N bits of continuously identical signal status. The special pattern detector 23 of FIG. 8 includes an XOR gate 231, a counter 232, a register 233, and a comparator 234. The XOR gate 231 receives the recorded EFM signal and a pattern level, and generates a counter-clear signal. The pattern level is determined according to the level of the continuously identical signal status of the special pattern. For example, if the special pattern is defined as a data pattern with 30 bits of continuously identical "0", the pattern level is 0. The counter 232 is driven by a reference clock. In this embodiment, the frequency of the reference clock approximates or equals to the bit rate of the recorded EFM signal. The counter 232 is cleared by the counter-clear signal output from the XOR gate 231. The value of the counter 232 is cleared to zero when the recorded EFM signal and the pattern level are different, and the value of the counter 232 increases when the recorded EFM signal and the pattern level are identical. The register 233 stores a detection length threshold, which may be smaller than or equal to the length of the continuously identical signal status of the special pattern. For example, when the special pattern is a data pattern with 30 bits of continuously identical "0", the detection length threshold may be set to 30 or less. The comparator 234 compares the detection length threshold with the count value of the counter 232, and enables a detection signal when the count value is equal to or greater than the detection length threshold.

Figure 9:
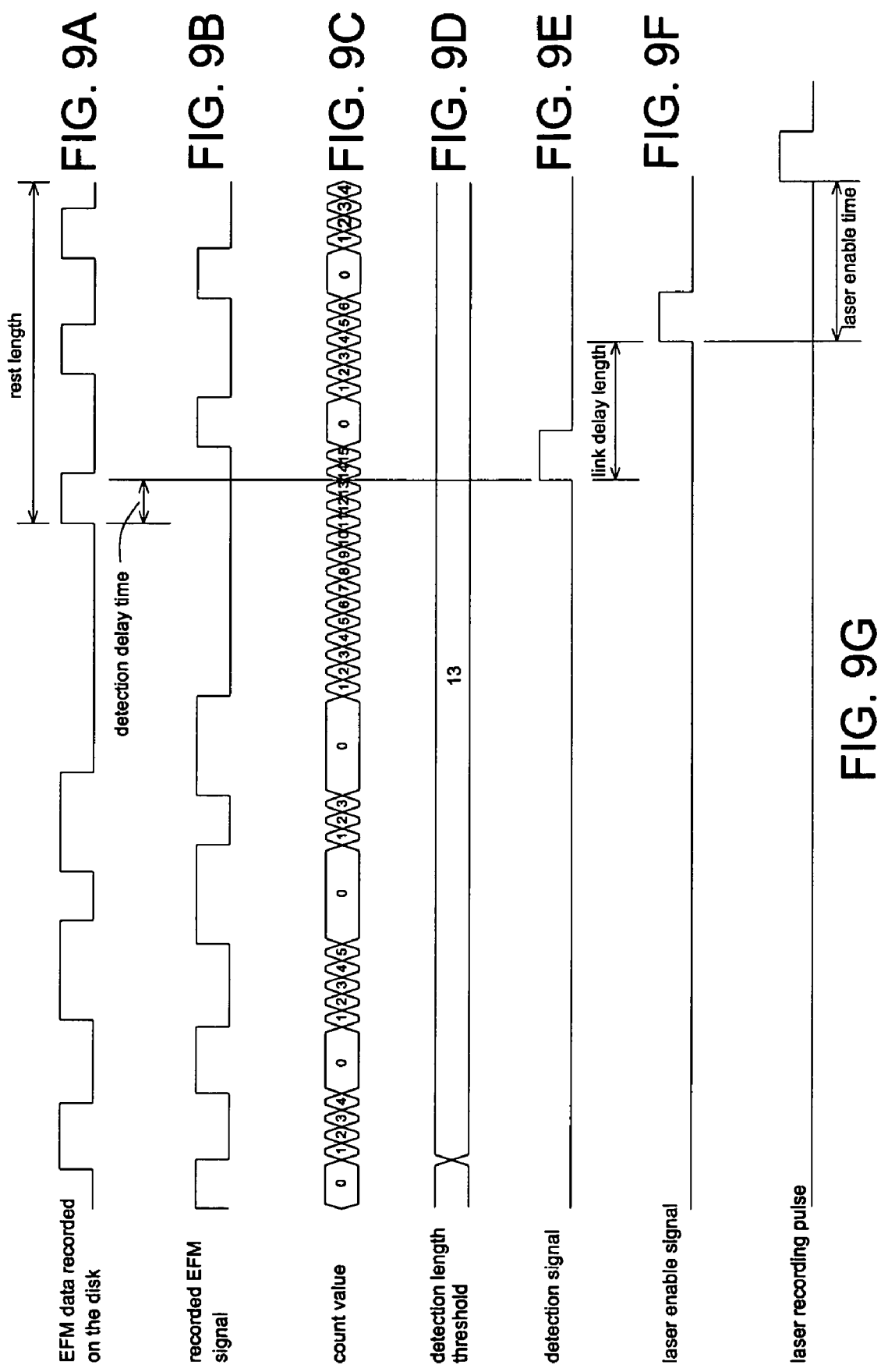

FIGS. 9A to 9G illustrate the waveforms of some signals at the interruption of recording and succeeding the recording when the special pattern detector of FIG. 8 is applied, wherein FIG. 9A illustrates the EFM data recorded on the disk, FIG. 9B illustrates the recorded EFM signal obtained from the disk, FIG. 9C illustrates the count value of the special pattern detector, FIG. 9D illustrates the detection length threshold of the special pattern detector, FIG. 9E illustrates the detection signal of the special pattern detector, FIG. 9F illustrates the laser enable signal, and FIG. 9G illustrates the laser recording pulse. As illustrated in FIG. 9A, when the encode-link control unit 32 replaces a portion of the recording EFM signal stream with the special pattern or inserts the special pattern into the recording EFM signal stream, some of the recording EFM data appears in back of the special pattern. The length of the recording EFM data behind the special pattern is calculated as the rest length $L_{rest}$.

When the count value of the counter 232 is equal to or greater than the detection length threshold of FIG. 9D, the detection signal is enabled, as shown in FIG. 9E. As shown in FIGS. 9A and 9E, there is a delay time between the end of the special pattern recorded on the disk and the time that the detection signal is enabled, and the delay time is defined as the detection delay time $T_{delay1}$. After the detection signal is enabled, the drive purposely waits for a delay time of a link delay length $L_{delay2}$ to enable the laser enable signal. Then, the optical pickup starts outputting the laser recording pulse with a delay of a laser enable time $T_{laser}$ after the laser enable signal is enabled. Therefore, as shown in FIGS. 9A~9G, the rest length $L_{rest}$ meets the equation (1), in which the rest length $L_{rest}$ is calculated after the special pattern is recorded, and the detection delay time $T_{delay1}$ and the laser enable time $T_{laser}$ can be obtained in advance:

$$L_{rest}=T_{delay1}+L_{delay2}+T_{laser} \quad (1).$$

To control the starting position for succeeding the length $L_{delay2}$ can be derived by the equation (2):

$$L_{delay2}=L_{rest}-T_{delay1}-T_{laser} \quad (2).$$

In addition, the special pattern can further contain the pattern with the EFM codes that are not appeared in the recording EFM signal. For example, if three continuous data symbol of "88" does not appear in the input of the EFM modulator 40, the EFM codes corresponding to the three continuous data symbol of "88" can be used as a special data pattern. As long as the special pattern detector detects the EFM codes corresponding to the three continuous data symbol of "88", it means that the special pattern has been found. Instead of recording the special pattern through the multiplexer 35, it also can also record the special pattern to the disk by replacing the origin input of the EFM modulator 40 with the three continuous data symbol of "88", or inserting the three continuous data symbol of "88" into the origin input of the EFM modulator 40 as a special data pattern. The way for detecting if this type of the special data pattern exists in a data stream is well known in the art, and detailed description will be omitted.

In general, the optical storage medium includes physical address prerecorded during manufacture of the optical storage medium, and the optical disk drive can locate the corresponding disk position according to the physical address. In CD-R/RW disc, the physical address can be the address information of ATIP prerecorded on the optical storage media, and the address information of ATIP is generated by the ATIP decoder 30. To improve the efficiency of searching for the special pattern, the optical disk drive further stores the physical address corresponding to where the special pattern is recorded and defines it as a special pattern physical address. A predetermined value is subtracted from the special pattern physical address to obtain a special pattern searching physical address, and then the drive starts to search for the special pattern after the physical address is equal to the special pattern searching physical address. In addition, it can stop the searching for the special pattern within a predetermined a searching range to enhance the efficiency of the special pattern search.

In addition to the physical address prerecorded on the optical storage media, a data position is also provided from the recorded EFM signal, such that the drive can locate the corresponding disk position according to the data position. In CD-R/RW disc, the data position can be the address information of the sub-code data on the recorded data, which can be provided by the sub-code decoder 20. To improve the efficiency of the special pattern search, the invention can further store the data position of the recording EFM signal corresponding to where the special pattern is recorded and define it as a special pattern data position. A predetermined value is subtracted from the special pattern data position to obtain a special pattern searching data position, and then the drive starts to search for the special pattern after the data position is equal to the special pattern searching data position. In addition, it can stop the special pattern search within a predetermined range to enhance the efficiency of the special pattern search.

In addition, the invention can further calculate and store a distance between the special pattern and the frame sync pattern of the recording EFM signal previous to the special pattern and define it as a special pattern frame sync distance. A predetermined value is subtracted from the special pattern frame sync distance to obtain a special pattern searching frame sync distance, and then the drive starts to search for the special pattern with a delay of the special pattern searching frame sync distance after the frame sync pattern of the recorded EFM signal is detected. In addition, it can stop the special pattern search within a predetermined range to enhance the efficiency of the special pattern search.

Figure 10:
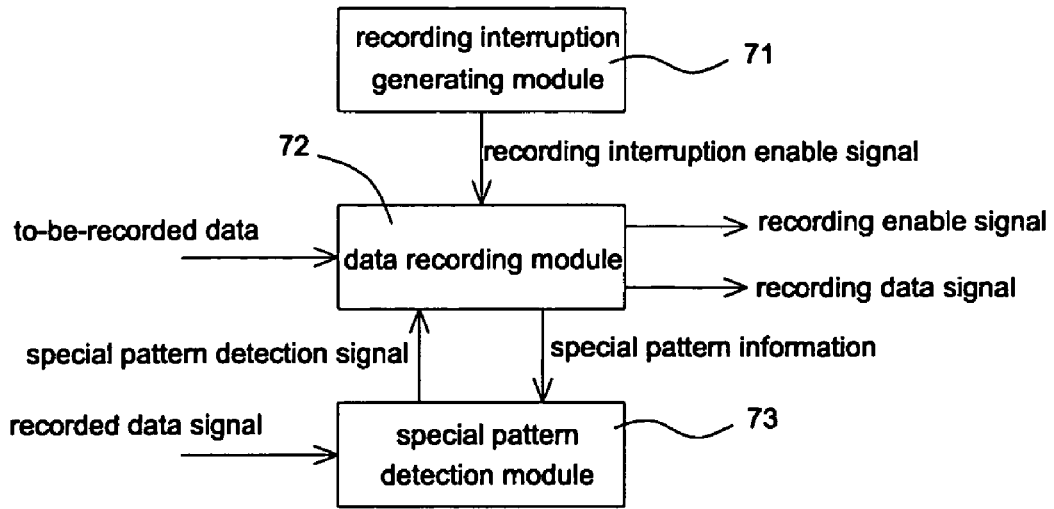
FIG. 10 illustrates a block diagram of the recording control of the invention.

The descriptions mentioned above are made with respect to an example of the CD-R/RW specification. The architecture suitable for various optical storage media, some type of the optical storage media will be described hereinbelow. FIG. 10 illustrates a block diagram of the recording control of the invention. The recording link block diagram of FIG. 10 is suitable for various optical storage media such as DVD±R/RWs, and other high-capacity optical storage media. For example, in the DVD±R/RW, the above-mentioned ATIP format corresponds to the ADIP/Pre-pit format thereof, the EFM modulation corresponds to the EFM+ modulation thereof, and the sub-code corresponds to the sector identification code (Sector ID) thereof. The terms associated with DVD may be found in the DVD specification, and detailed descriptions thereof will be omitted.

In the FIG. 10, the recording interruption generating module 71 detects a condition of interruption and generates a recording interruption enable signal, wherein the condition of interruption is the condition that the recording needs to be interrupted, such as lack of data or other servo problems. The data recording module 72 receives to-be-recorded data, which can be the data that has been CIRC-encoded but has not been EFM-modulated in the previous example. Next, the data recording module 72 generates a recording data signal (recording EFM signal) and a recording enable signal to control a recording laser to record data on the optical storage media. After the recording interruption enable signal is enabled, the recording enable signal is disabled to stop the recording, and the above-mentioned special pattern is put into the recording data signal before the recording is stopped. Thereafter, the data recording module 72 outputs the special pattern information corresponding to the special pattern to the special pattern detection module 73. The special pattern detection module 73 then stores the special pattern information. The special pattern detection module 73 receives the recorded data signal obtained from the optical storage media and detects the special pattern from the recorded data signal. When a data pattern of the recorded data signal is detected to be similar to or same as a portion of the special pattern, a special pattern detection signal is enabled. Thereafter, the data recording module 72 succeeds enabling the recording enable signal after the special pattern detection signal is enabled.

Figure 11:
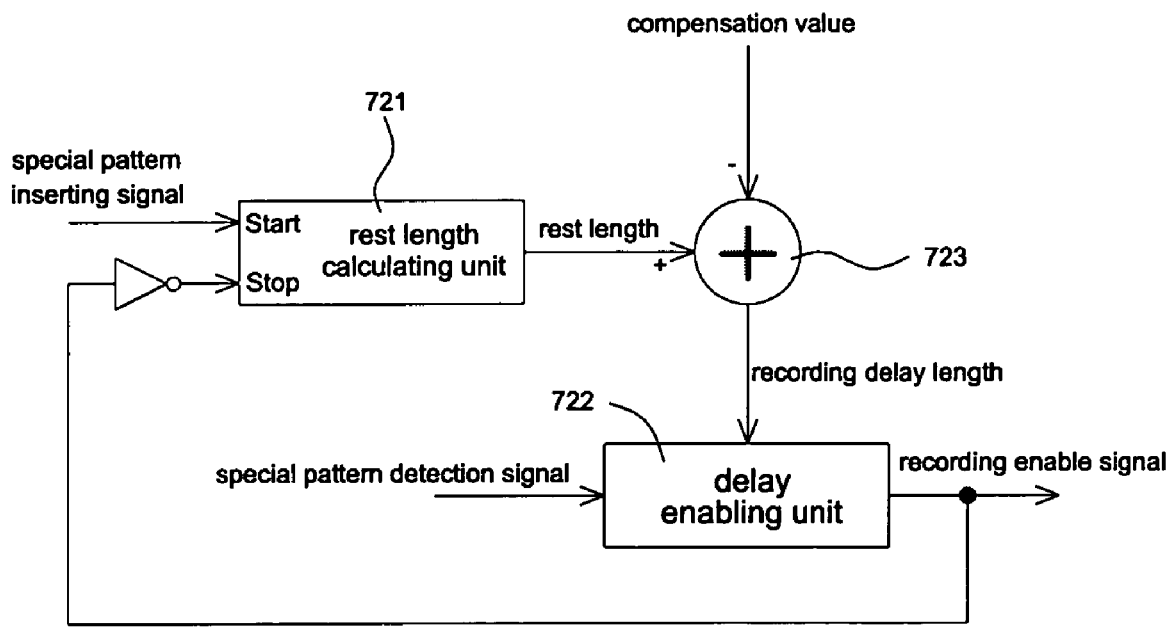
FIG. 11 illustrates an embodiment of the data recording module of FIG. 10.

FIG. 11 illustrates the block diagram of the data recording module 72. Referring to FIG. 11, the data recording module 72 includes a rest length calculating unit 721, a subtractor 723 and a delay enabling unit 722. The rest length calculating unit 721 calculates the rest length of the recording data signal behind the special pattern. The data recording module 72 receives a compensation value, and uses the subtractor 723 to subtract the compensation value from the rest length and then to generate a recording delay length. When the delay enabling unit 722 receives the enabled special pattern detection signal, the delay enabling unit delays a time of the recording delay length to enable the recording enable signal. The delay compensation concept has been mentioned above, and detailed descriptions thereof will be omitted.

Figure 12:
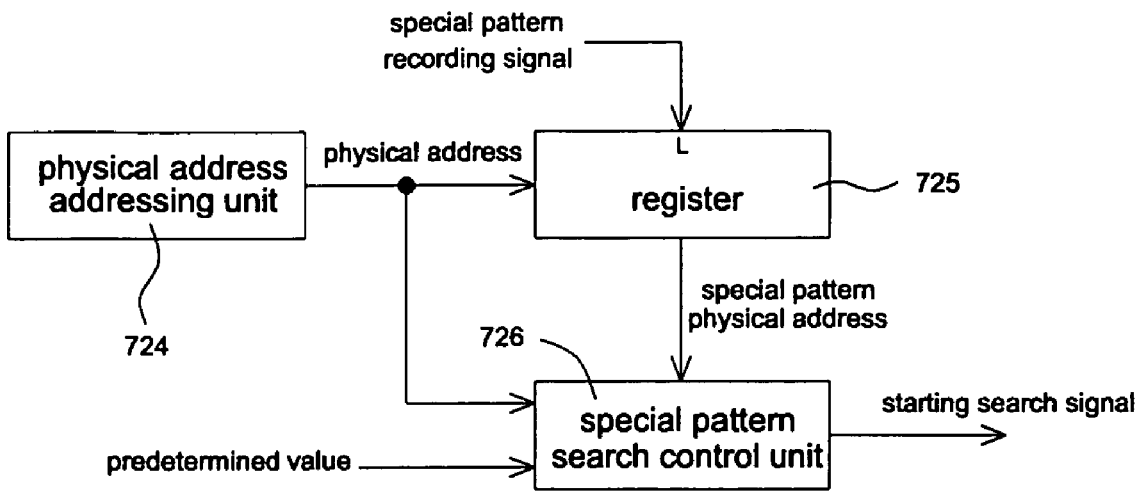
FIG. 12 illustrates another embodiment of the data recording module of FIG. 10.

FIG. 12 shows another example of the data recording module 72. Referring to FIG. 12, the data recording module 72 further includes a physical address addressing unit 724, a register 725, and a special pattern search control unit 726. The physical address addressing unit 724 provides the physical address prerecorded on the optical storage medium. The register 725 stores the physical address corresponding to where the special pattern is recorded as a special pattern physical address. The special pattern search control unit 726 subtracts a predetermined value from the special pattern physical address to obtain a special pattern searching physical address, and enables a starting search signal after the physical address is equal to the special pattern searching physical address. The special pattern detection module 73 starts to search for the special pattern after the starting search signal is enabled. Then, as mentioned before, the starting search signal is disabled after searching for the special pattern within a predetermined range, if no special pattern is found.

In addition, the physical address addressing unit 724 can be replaced with a data position addressing unit for detecting the data position of the recorded data signal to provide a data position. Then, the register 725 stores the data position of the recording data signal where the special pattern is recorded as a special pattern data position. The special pattern search control unit 726 subtracts a predetermined value from the special pattern data position to obtain a special pattern searching data position, and enables a starting search signal after the data position is equal to the special pattern searching data position.

Figure 13:
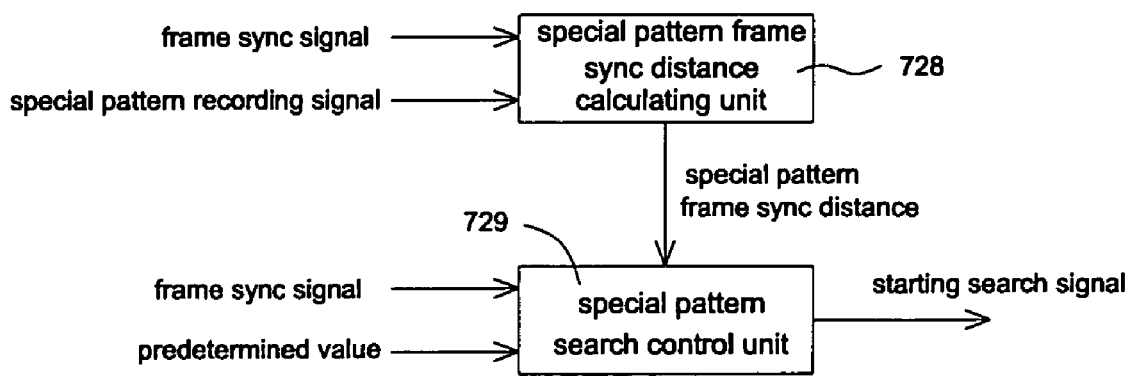
FIG. 13 illustrates still another embodiment of the data recording module of FIG. 10.

In addition, the data recording module 72 can further include a special pattern frame sync distance calculating unit 728 and a special pattern search control unit 729, as shown in FIG. 13. The special pattern frame sync distance calculating unit 728 calculates the distance between the special pattern and the frame sync of the recording data that is adjacent to the special pattern as a special pattern frame sync distance. The special pattern search control unit 729 subtracts a predetermined value from the special pattern frame sync distance to obtain a special pattern searching frame sync distance. With a delay of the special pattern searching frame sync distance after the frame sync is detected in the recorded data signal (the output of the sync pattern detector 24 in FIG. 4), a starting search signal is enabled. The starting search signal is disabled after searching for the special pattern within a predetermined range.

While certain exemplary embodiments have been described and shown in the accompanying drawings, it is to be understood that such embodiments are merely illustrative of and not restrictive on the broad invention, and that this invention not be limited to the specific construction and arrangement shown and described, since various other modifications may occur to those ordinarily skilled in the art.

What is claimed is:

1. A recording method for controlling a recording operation of recording a recording data on a optical storage medium so as to locate a starting position of a succeeding recording operation after a condition of interruption occurs to interrupt the recording operation, the method comprising:
   recording a special pattern on the optical storage medium after the condition of interruption occurs and before the recording operation is interrupted;
   locating the starting position, wherein a recorded data signal is obtained from the optical storage medium for searching for the special pattern after the condition of interruption is eliminated, and a detection signal is enabled with a delay of a detection delay time after the recorded data signal is detected to be similar to or the same as a portion of the special pattern;
   enabling a recording laser with a delay of a link delay length after the detection is enabled; and
   performing the succeeding recording with a delay of a laser enable time after the recording laser is enabled;
   wherein the step of recording the special pattern on the optical storage medium comprises a step of replacing a portion of recording data with the special pattern.

2. The recording method according to claim 1, wherein the step of recording the special pattern on the optical storage medium comprises a step of inserting the special pattern into the recording data.

3. The recording method according to claim 1, wherein the step of recording the special pattern on the optical storage medium further comprises a step of calculating a length of the recording data behind the special pattern and defining it as a rest length.

4. The recording method according to claim 3, wherein the link delay length is determined by subtracting the detection delay time and the laser enable time from the rest length.

5. The recording method according to claim 1, wherein the special pattern comprises a data pattern that can be detected as being different from a normal format of the recording data.

6. The recording method according to claim 1, wherein the special pattern comprises a data pattern that does not appear in the recording data.

7. The recording method according to claim 1, wherein the special pattern comprises a data pattern having a length of continuously identical signal status greater than the maximum length of continuously identical signal status of the recording data.

8. The recording method according to claim 1, wherein the step of recording the special pattern on the optical storage medium further comprises a step of providing a physical address of the optical storage medium from detecting an address information prerecorded on the optical storage medium, and storing the physical address of the optical storage medium corresponding to where the special pattern is recorded as a special pattern physical address.

9. The recording method according to claim 8, wherein the step of locating the starting position comprises a step of subtracting a predetermined value from the special pattern physical address to obtain a special pattern searching physical address, and a step of starting to search for the special pattern according to the physical address of the optical storage medium and the special pattern searching physical address.

10. The recording method according to claim 9, wherein the step of locating the starting position further comprises a step of stopping the searching for the special pattern after searching for the special pattern within a predetermined range.

11. The recording method according to claim 1, wherein the step of recording the special pattern on the optical storage medium further comprises steps of providing a data position of the recording data from detecting an address information of the recording data, and storing the data position of the recording data corresponding to where the special pattern on the optical storage medium is recorded as a special pattern data position.

12. The recording method according to claim 11, wherein the step of locating the starting position comprises steps of subtracting a predetermined value from the special pattern data position to obtain a special pattern searching data position, providing a data position of the recorded data signal from detecting an address information of the recorded data signal, and starting to search for the special pattern according to the data position of the recorded data signal and the special pattern searching data position.

13. The recording method according to claim 12, wherein the step of locating the starting position further comprises a step of stopping the searching for the special pattern after searching for the special pattern within a predetermined range.

14. The recording method according to claim 1, wherein the step of recording the special pattern on the optical storage medium further comprises a step of storing a distance between the special pattern and a frame sync pattern of the recording data that is adjacent to the special pattern as a special pattern frame sync distance.

15. The recording method according to claim 14, wherein the step of locating the starting position comprises steps of subtracting a predetermined value from the special pattern frame sync distance to obtain a special pattern searching frame sync distance, detecting a frame sync pattern of the recorded data signal from the recorded data signal, and starting to search for the special pattern with a delay of the special pattern searching frame sync distance after the frame sync pattern of the recorded data signal is detected.

16. The recording method according to claim 15, wherein the step of locating the starting position further comprises a step of stopping the searching for the special pattern after searching for the special pattern within a predetermined range.

17. A recording drive for controlling a recording operation of recording a recording data on an optical storage medium so as to locate a starting position of a succeeding recording operation after a condition of interruption occurs to interrupt the recording operation, the recording drive comprising:
a recording interruption generating module for enabling a recording interruption enable signal when the condition of interruption occurs;
a data recording module for generating a recording enable signal to control a recording laser so as to record the recording data on the optical storage medium, wherein the data recording module records a special pattern on the optical storage medium, outputs a special pattern information corresponding to the special pattern, and disables the recording enable signal after the recording interruption enable signal is enabled, and re-enables the recording enable signal according to a special pattern detection signal; and
a special pattern detection module for receiving the special pattern information and a recorded data signal obtained from the optical storage medium to detect the special pattern, and enabling the special pattern detection signal when the recorded data signal is detected to be similar to or the same as a portion of the special pattern;
wherein the data recording module further comprises:
a rest length calculating unit for calculating a rest length of the recording data after the special pattern before the recording enable signal is disabled;
a subtractor for receiving the rest length and a compensation value and subtracting the compensation value from the rest length to generate a recording delay length;
a delay enabling unit for receiving the special pattern detection signal and enabling the recording enable signal with a delay of the recording delay length after the special pattern detection signal is enabled;
a physical address addressing unit for providing a physical address of the optical storage medium from detecting an address information prerecorded on the optical storage medium; and
a register for storing the physical address of the optical storage medium corresponding to where the special pattern is recorded, as a special pattern physical address;
wherein the compensation value is determined according to the time between when the recording enable signal is enabled and the recording laser starts to record the recording data and wherein the data recording module further comprises a special pattern frame sync distance calculating unit for calculating a distance between the special pattern and a frame sync pattern of the recording data that is adjacent to the special pattern, and storing the distance as a special pattern frame sync distance.

18. The recording drive according to claim 17, wherein the data recording module further comprises a special pattern search pattern search control unit for subtracting a predetermined value from the special pattern frame sync distance to obtain a special pattern searching frame sync distance, for detecting a frame sync pattern of the recorded data signal from the recorded data signal, and for starting to search for the special pattern with a delay of the special pattern searching frame sync distance after the frame sync pattern of the recorded data signal is detected.

19. The recording drive according to claim 18, wherein the special pattern search control untill stops the searching for the special pattern after searching for the special pattern within a predetermined range.

* * * * *